United States Patent [19]

Ashby

[11] 4,096,160

[45] Jun. 20, 1978

[54] CONTINUOUS DEVOLATILIZATION OF SILANOL-TERMINATED SILICONE POLYMER

[75] Inventor: Bruce Allan Ashby, Schenectady, N.Y.

[73] Assignee: General Electric Company, Waterford, N.Y.

[21] Appl. No.: 678,738

[22] Filed: Apr. 21, 1976

[51] Int. Cl.$^2$ ............................................. C07F 7/20
[52] U.S. Cl. .............................................. 260/448.2 E
[58] Field of Search ................................. 260/448.2 E

[56] References Cited

U.S. PATENT DOCUMENTS

| | | | |
|---|---|---|---|
| 2,834,754 | 5/1958 | Hatch et al. | 260/46.5 R |
| 3,073,380 | 1/1963 | Palmason | 159/49 |
| 3,469,617 | 9/1969 | Palmason | 159/47 |
| 3,696,090 | 10/1972 | Lampe | 260/185 |
| 3,803,195 | 4/1974 | Nitzsche et al. | 260/448.2 E |
| 3,853,934 | 12/1974 | Siciliano et al. | 260/448.2 E |
| 3,903,047 | 9/1975 | Ashby | 260/448.2 E X |

*Primary Examiner*—Paul F. Shaver
*Attorney, Agent, or Firm*—Morgan, Finnegan, Pine, Foley & Lee

[57] ABSTRACT

An improved process is provided for preparing a linear diorganopolysiloxane fluid having terminal hydroxy groups, which is substantially free of cyclic polysiloxanes. In the process, a linear diorganopolysiloxane fluid containing lower boiling cyclic polysiloxanes is continuously fed with steam into an evacuated, tortuous, confined passageway to form a turbulent mixture of the silicone fluid and steam in the passageway, the mixture is passed through the passageway at elevated temperatures and moderate vacuum to form a vaporized mixture comprising steam and cyclic polysiloxanes which have been freed from the linear diorganopolysiloxane fluid, the vaporized mixture of steam and cyclics and the linear diorganopolysiloxane substantially free of cyclics are removed from the passageway, and the vaporized mixture of steam and cyclics is separated from the cyclic-free diorganopolysiloxane fluid.

10 Claims, 1 Drawing Figure

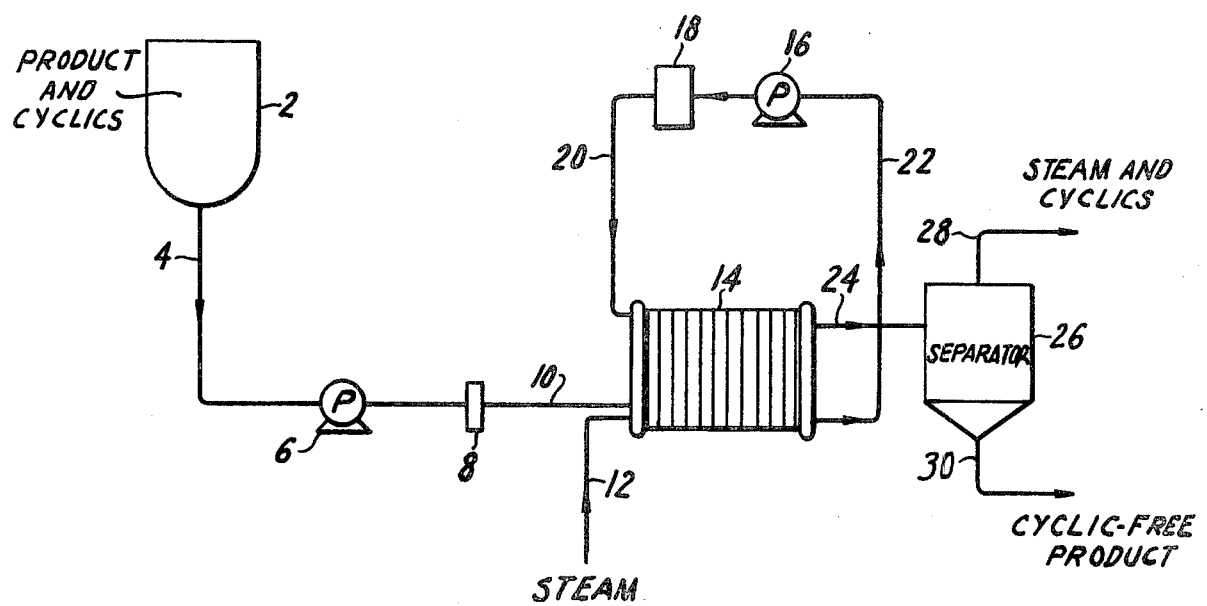

CONTINUOUS DEVOLATILIZATION OF SILANOL-TERMINATED SILICONE POLYMER

This invention relates to an improved method of producing a room-temperature vulcanizable linear diorganopolysiloxane fluid. More particularly, it is concerned with continuously devolatizing a silicone fluid which contains volatile, low-boiling cyclic polysiloxanes, under partial vacuum, in a parallel plate-type stripping unit to remove the cyclics from the silicone fluid at temperatures below those at which they would normally vaporize at atmospheric pressure.

BACKGROUND OF THE INVENTION

The usual commercial method of separating undesired low-boiling species from silanolterminated diorganopolysiloxanes consists of ordinary batch vacuum distillation. Heat transfer is always a problem in such processes, causing sometimes localized overheating, color development, loss of product and the like. An improved batchwise method of stripping volatile species from silicone polymers is disclosed by Hatch et al in U.S. Pat. No. 2,834,754. However, the process calls for kneading the polymer mixture in an apparatus suitable for such a purpose, e.g., a Baker-Perkins or Banbury mixer, and as is well known, such machinery is heavy and expensive. Continuous vacuum stripping has also been proposed as a means for removing such volatiles from silanol-terminated diorganopolysiloxanes, but this requires higher temperatures than are desireable, and greater energy usage.

Now it has been discovered that the relatively low-boiling species, e.g., cyclic polysiloxanes, can be removed from such silanol-stopped diorganopolysiloxanes, continuously and under unexpectedly mild conditions, by a method which employs steam added to the product before the devolatilization step.

More particularly, if steam and the cyclic-containing silicone polymer are each fed to an evacuated tortuous, confined passageway, such as a parallel plate stripping unit, at a moderately elevated temperature and under moderate vacuum, the volatile content of the polymer can be efficiently reduced continuously and quickly from an initial amount of about 9 to 18% by weight of the feed, on a steam-free basis, to less than 2% by weight. This process is more advantageous than batchwise methods because it is continuous. The process of the invention also has major advantages over continuous vacuum distillation methods which do not employ steam in that it accomplishes the desired stripping of volatile cyclics under mild conditions, with greater devolatilizing effectiveness, and without degradation of the polymer.

SUMMARY OF THE INVENTION

According to the present invention, there is provided an improved process for continuously producing a substantially cyclic polysiloxane-free linear diorganopolysiloxane fluid which is chain-stopped primarily with hydroxy groups, said process comprising the steps of:

(i) feeding steam and a linear diorganopolyxiloxane fluid chain-stopped primarily with hydroxy groups, said fluid also containing low-boiling cyclic polysiloxanes, into an evacuated, tortuous, confined passageway to form a turbulent mixture of said linear diorganopolysiloxane fluid and steam in the passageway;

(ii) passing said mixture of linear diorganopolysiloxane fluid and steam through the tortuous passageway under partial vacuum and at a temperature below that at which said cyclic polysiloxanes would normally vaporize at normal atmospheric pressure, e.g., 760 mm., to form a vaporized mixture comprising steam and cyclic polysiloxanes freed from said linear diorganopolysiloxane fluid;

(iii) removing said vaporized mixture comprising steam and cyclic polysiloxanes and said linear diorganopolysiloxane fluid which is substantially free of said cyclic polysiloxanes from the tortuous passageway; and (iv) separating said vaporized mixture of steam and cyclic polysiloxanes from said substantially cyclic polysiloxane-free linear diorganopolysiloxane fluid.

With reference to the process broadly described above, the diorganopolysiloxane fluid will preferably be a silanol-terminated dimethylpolysiloxane fluid having a viscosity in the range of from about 1,000 to about 1,000,000 centipoise at 25° C. The cyclic polysiloxanes will correspondingly generally comprise cyclic methylpolysiloxanes, e.g., trimers, tetramers, pentamers, and the like.

DETAILED DESCRIPTION OF THE INVENTION

The diorganopolysiloxanes to which the process of this invention is applicable are well known in the art. In general, these are linear diorganopolysiloxanes which are useful in room temperature vulcanizable (RTV) compositions, and which can have the formula,

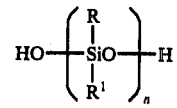

wherein R and R¹ can be the same or different, and are each organic radicals selected from alkyl, aryl, haloalkyl, haloaryl, alkenyl, alkaryl, aralkyl, haloalkenyl, cyanoalkyl, cycloalkyl, cycloalkenyl, and $n$ has a value of at least 10.

The diorganopolysiloxanes include those which are useful in two-part RTV compositions, as well as those which are useful in one-part RTV compositions. Such compositions are well known in the art and generally comprise a linear polymer, e.g., a silanol-stopped linear polymer such as described above, and a cross-linking agent.

Within the scope of the definition of diorganopolysiloxanes useful in this invention are copolymers of various types of diorganosiloxane units, such as silanol chain-stopped copolymers of dimethylsiloxane units, diphenylsiloxane units and methylphenyl siloxane units, or for example, copolymers of dimethylsiloxane units, methylphenylsiloxane units and methylvinylsiloxane units. Preferably, R and R¹ are predominantly alkyl.

The viscosity of the diorganopolysiloxane can vary broadly, from thin fluids to thick, viscous materials, depending upon the value of $n$ and the nature of the particular organic groups represented by R and R¹. In general, the viscosity will range from about 10 to about 10,000,000 cps. at 25° C. Preferably, it will be in the range of about 1,000 to about 1,000,000 and most preferably, from about 10,000 to about 200,000 cps. at 25° C.

In their commercial preparation, such polysiloxanes can be produced by hydrolyzing one or more hydrocarbon substituted dichlorosilanes to produce a mixture of linear and cyclic polysiloxanes. Upon fractional distillation, there is obtained a pure product containing the low boiling, low molecular weight cyclic polymers free of any significant amount of monofunctional and trifunctional groups.

The pure cyclic polysiloxanes are next mixed in the desired proportions with an alkaline catalyst and subjected to an equilibration procedure in the presence of water to obtain the silanol-terminated diorganopolysiloxane of the above formula. The equilibration is carried out at temperatures of about 125° C. to 150° C. After the equilibration reaction has proceeded for about 2 hours, there is reached a point at which the mixture contains predominantly the desired linear polymers and a relatively minor amount of cyclic polymers.

When this equilibrium point has been reached there is added to the mixture a sufficient amount of an acid donor in order to neutralize the catalyst and to terminate the polymerization reaction.

Low molecular weight, volatile species, similar in structure to the bulk of the relatively high molecular weight polymer reaction product, i.e., having the same recurring structural units, remain in the reaction mixture. These must be removed from the polysiloxane reaction product in order to give a product with more desirable physical properties. Removal is accomplished readily and efficiently by the present method.

In carrying out devolatilization, the diorganopolysiloxane feed material is kept at temperatures low enough to avoid degradation and other harmful thermal effects to the polymer. The process of this invention enables devolatilization to be accomplished at moderately elevated temperatures, e.g., temperatures below those at which the cyclic species normally vaporize at normal atmospheric pressure. For the present process, temperatures of from about 50° C. to about 175° C. are preferred.

Devolatilization is aided in the present invention by the use of reduced pressure, which is maintained in the system by conventional means, e.g., vacuum pumps, or the like. Pressures of from about 30 to about 70 mm are preferred. A pressure of about 50 mm is especially preferred.

DESCRIPTION OF THE PREFERRED EMBODIMENTS

Referring to the accompanying drawing, there is shown an apparatus in which a feed material comprising a linear silanol-terminated dimethylpolysiloxane fluid containing 14 wt. % of a mixture of hexamethylcyclotrisiloxane, octamethylcyclotetrasiloxane, pentamers, hexamers, and other relatively low-boiling cyclic species, and prepared as described above, is fed from hold tank 2, through conduit 4 and variable speed pump 6, which conveys the feed material through filter 8. Filter 8 removes from the feed material any undesirable or foreign matter, e.g., dirt, lumpy particles, and the like. The filtered feed material exits from filter 8, through conduit 10, and into plate pack stripping unit 14. Stripping unit 14 contains a series of heating plates arranged in parallel series, and provided a tortuous confined passageway which is under moderate vacuum, e.g., about 50 mm Hg.

The plates of stripping unit 14 are heated by a fluid which circulates through cavities located between the walls of the plates. The fluid is pumped by pump 16 through heater 18 and conduit 20, into stripping unit 14. The heating fluid emerges from unit 14 through conduit 22, and is recirculated.

Steam from conduit 12, and polysiloxane feed material from conduit 10, are introduced into stripping unit 14 and flow rapidly therethrough and the feed material is caused to impinge upon the heated plates of unit 14, and the cyclic contaminants are volatilized and freed from the dimethylpolysiloxane fluid.

Preferred stripping units, having a parallel plate type arrangement, are described in detail in U.S. Pat. Nos. 3,073,380 and 3,469,617, the disclosures of which are incorporated herein by reference.

The linear dimethylpolysiloxane which has been thus freed of substantially all the cyclic species, e.g., containing less than 2% by weight of the cyclic species, and the admixture of steam and volatilized cyclic polysiloxanes emerge from stripping unit 14, through line 24, into separator 26, wherein the steam and volatiles are separated from the cyclic free product and removed as a first stream through conduit 28. The stripped dimethylpolysiloxane product collects at the bottom of separator 26, and is removed as a second stream, through conduit 30.

Other modifications and variations of the process of this invention are possible in the light of the present disclosure. It is therefore to be understood that changes may be made in the particular embodiments of the invention described above which are within the full intended scope of the invention as defined in the appended claims.

I claim:

1. A process for continuously producing a substantially cyclic polysiloxane-free linear diorganopolysiloxane fluid which is chain-stopped primarily with hydroxy groups, said process comprising the steps of:
   (i) feeding steam and a linear diorganopolysiloxane fluid chain-stopped primarily with hydroxy groups, said fluid also containing low-boiling cyclic polysiloxanes, into an evacuated, tortuous, confined passageway to form a turbulent mixture of said linear diorganopolysiloxane fluid and steam in the passageway;
   (ii) passing said mixture of linear diorganopolysiloxane fluid and steam through the tortuous passageway under partial vacuum and at a temperature below that at which said cyclic polysiloxanes would normally vaporize at atmospheric pressure, to form a vaporized mixture comprising steam and cyclic polysiloxanes freed from said linear diorganopolysiloxane fluid;
   (iii) removing said vaporized mixture comprising steam and cyclic polysiloxanes and said linear diorganopolysiloxane fluid which is substantially free of said cyclic polysiloxanes from the tortuous passageway; and
   (iv) separating said vaporized mixture of steam and cyclic polysiloxanes from said substantially cyclic polysiloxane-free linear diorganopolysiloxane fluid.

2. A process as defined in claim 1 wherein said cyclic diorganosiloxanes comprise from about 9 to about 18% by weight of the feed stock, on a steam-free basis, in step (i), and less than 2% by weight of the final product, in step (iv).

3. A process as defined in claim 1 wherein said linear diorganopolysiloxane fluid is a dimethylpolysiloxane fluid chain-stopped primarily with hydroxy groups, and said cyclic polysiloxanes comprise cyclic methylpolysiloxanes.

4. A process as defined in claim 1 wherein said diorganopolysiloxane fluid has a viscosity in the range of from about 1,000 to about 1,000,000 cps. at 25° C.

5. A process as defined in claim 1 wherein the pressure is in the range from about 30 to about 70 mm.

6. A process as defined in claim 1 wherein the temperature is in the range from about 50° to about 175° C.

7. A process as defined in claim 1 wherein step (iv) is carried out in a separator, from which said vaporized mixture of steam and cyclic polysiloxanes is continuously removed as a first stream and said substantially cyclic polysiloxane-free linear diorganopolysiloxane fluid is removed as a second stream.

8. A process for continuously producing a substantially cyclic methylpolysiloxane-free linear dimethylpolysiloxane fluid which is chain-stopped primarily with hydroxy groups, said process comprising the steps of:
  (i) feeding steam and a linear dimethylpolysiloxane fluid chain-stopped primarily with hydroxy groups, said fluid also containing low-boiling cyclic methylpolysiloxanes, into an evacuated, tortuous, confined passageway to form a turbulent mixture of said linear dimethylpolysiloxane fluid and steam in the passageway;
  (ii) passing said mixture of linear dimethylpolysiloxane fluid and steam through the tortuous passageway at a pressure of from about 30 to about 70 mm Hg and a temperature of from about 50° to about 175° C., to form a vaporized mixture comprising steam and cyclic methylpolysiloxanes freed from said linear dimethylpolysiloxane fluid;
  (iii) removing said vaporized mixture comprising steam and cyclic dimethylsiloxanes and said linear dimethylpolysiloxane fluid which is substantially free of said cyclic dimethylsiloxanes from the tortuous passageway; and
  (iv) separating said vaporized mixture of steam and cyclic dimethylsiloxanes from said substantially cyclic methylpolysiloxane-free linear dimethylpolysiloxane fluid.

9. A process as defined in claim 8 wherein said cyclic methylpolysiloxanes comprise from about 9 to about 18% by weight of the feed stock, on a steam-free basis, in step (i), and less than 2% by weight of the final product, in step (iv).

10. A process as defined in claim 1 wherein said linear diorganopolysiloxane has the formula:

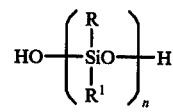

wherein R and R$^1$ can be the same or different, and are each organic radicals selected from alkyl, aryl, haloalkyl, haloaryl, alkenyl, alkaryl, aralkyl, haloalkenyl, cyanoalkyl, cycloalkyl, cycloalkenyl, and $n$ has a value of at least 10.

* * * * *